United States Patent
Kurihara et al.

(10) Patent No.: US 7,664,128 B2
(45) Date of Patent: Feb. 16, 2010

(54) PORTABLE INFORMATION TERMINAL, IP ADDRESS SETTING PROGRAM, AND IP ADDRESS SETTING METHOD

(75) Inventors: Naoki Kurihara, Inagi (JP); Yoshinori Ito, Inagi (JP); Takami Kasasaku, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 453 days.

(21) Appl. No.: 11/250,574

(22) Filed: Oct. 17, 2005

(65) Prior Publication Data
US 2007/0014285 A1   Jan. 18, 2007

(30) Foreign Application Priority Data
Jul. 15, 2005   (JP)   ............................. 2005-206981

(51) Int. Cl.
*H04L 12/28* (2006.01)
(52) U.S. Cl. .................................. 370/419; 370/395.52
(58) Field of Classification Search ........................ None
See application file for complete search history.

(56) References Cited

U.S. PATENT DOCUMENTS

| | | | |
|---|---|---|---|
| 6,973,076 B2* | 12/2005 | Takeda et al. ............... | 370/356 |
| 7,062,595 B2* | 6/2006 | Lindsay et al. ............... | 710/315 |
| 7,245,627 B2* | 7/2007 | Goldenberg et al. ........ | 370/419 |
| 2004/0039849 A1* | 2/2004 | Oura ............................. | 710/1 |
| 2006/0075123 A1* | 4/2006 | Burr et al. .................... | 709/228 |

FOREIGN PATENT DOCUMENTS

| | | |
|---|---|---|
| JP | 2003-134118 | 5/2003 |
| JP | 2003-348093 | 5/2003 |

\* cited by examiner

*Primary Examiner*—Phirin Sam
(74) *Attorney, Agent, or Firm*—Staas & Halsey LLP

(57) ABSTRACT

The present invention has been made to provide a portable information terminal, an IP address setting program, and an IP address setting method capable of eliminating the need to assign a static IP address to each portable information terminal and eliminating the need to provide a DHCP server for each portable information terminal.

A portable information terminal 1 performs a communication using an IP address by connecting to a USB-LAN adapter 2. The potable information terminal 1 has a USB interface 15 that connects to the USB-LAN adapter 2 and a controller 11 that reads an IP address previously stored in the USB-LAN adapter 2 through the USB interface 15 and sets the IP address to the portable information terminal as the IP address thereof.

12 Claims, 5 Drawing Sheets

PORTABLE INFORMATION TERMINAL, IP ADDRESS SETTING PROGRAM, AND IP ADDRESS SETTING METHOD

BACKGROUND OF THE INVENTION

1. Field of the Invention

The present invention relates to a portable information terminal that communicates with a network by connecting to a NIC, an IP address setting program, and an IP address setting method.

2. Description of the Related Art

In recent years, information of a large number of portable information terminals are often collectively managed. In such a case, a system in which a NIC (Network Interface Card) having an interface such as USB (Universal Serial Bus) is connected to the portable information terminal and thereby the portable information terminal is connected to a LAN (Local Area Network) through the NIC is used. Further, in such a system, if, under the circumstances in which an unspecified number of potable information terminals are allowed to be connected to a NIC, the NIC is used only when the portable information terminal needs to be connected to the LAN, the number of NICs can be reduced to less than the number of portable information terminals.

As a method of setting an IP (Internet Protocol) address to a NIC adapter to be connected to the potable information terminal, a method in which a static IP address of the portable information terminal is set to the NIC on the OS (Operating System) of the portable information terminal, or a method in which a DHCP (Dynamic Host Configuration Protocol) server installed in the LAN automatically sets the IP address of the portable information terminal to the NIC is available.

As a prior art related to the present invention, Jpn. Pat. Appln. Laid-Open Publication No. 2003-348093 is known. A communication processing apparatus and a network interface switching method in the publication assigns an IP address to a NIC and, when detecting a failure of the NIC, assigns the IP address of the failed NIC to another NIC.

However, in the case of adopting the method in which a user manually sets an IP address on the OS of the portable information terminal, a setting error, such as duplication of IP address, is easier to occur. Further, in the case of using a large number of portable information terminals, thousands of man-hours are involved and an increasing number of static IP address become necessary.

Further, in the case of adopting the method in which a DHCP server within the LAN automatically sets the IP address to the NIC, an IP address is assigned to the portable information terminal every time the terminal is connected to the LAN. Therefore, an unspecified number of portable information terminals are likely to access the LAN. Thus, problem relating to security is caused.

To solve the above problems, a countermeasure in which a DHCP server function is provided for each NIC. However, this increases cost.

SUMMARY OF THE INVENTION

The present invention has been made to solve the above problems, and an object thereof is to provide a portable information terminal, an IP address setting program, and an IP address setting method capable of eliminating the need to assign a static IP address to each portable information terminal and eliminating the need to provide a DHCP server for each portable information terminal.

To solve the above problems, according to a first aspect of the present invention, there is provided a portable information terminal that performs a communication using an IP address by connecting to a NIC, comprising: a NIC interface section that connects to a NIC, and a controller that reads an IP address previously stored in the NIC through the NIC interface section and sets the IP address to the portable information terminal as the IP address thereof.

In the portable information terminal according to the present invention, when a user inputs an IP address, the controller writes the IP address input by the user in the NIC through the NIC interface section.

In the portable information terminal according to the present invention, the controller reads an IP address previously stored in the NIC at the initialization time of the NIC and sets the IP address to the portable information terminal as the IP address thereof.

In the portable information terminal according to the present invention, when a user inputs an IP address, the controller writes the IP address input by the user in the NIC through the NIC interface section at the initialization time of the NIC.

In the portable information terminal according to the present invention, the IP address to be stored in the NIC is to be stored in a non-volatile semiconductor memory in the NIC.

According to a second aspect of the present invention, there is provided an IP address setting program allowing a computer which is a portable information terminal to set an IP address to the portable information terminal connected to a NIC, the program allowing the computer to execute: a NIC reading step that reads an IP address previously stored in the NIC; and a portable information terminal setting step that sets the IP address read in the IP address reading step to the portable information terminal as the IP address thereof.

The IP address setting program according to the present invention further allows the computer to execute, before the NIC reading step, a NIC writing step that writes an IP address, which has been input by a user, in the NIC.

In the IP address setting program according to the present invention, the NIC reading step and portable information terminal setting step are executed at the initialization time of the NIC.

In the IP address setting program according to the present invention, the NIC writing step is executed at the initialization time of the NIC.

In the IP address setting program according to the present invention, the IP address to be stored in the NIC is to be stored in a non-volatile semiconductor memory in the NIC.

According to a third aspect of the present invention, there is provided an IP address setting method that performs IP address setting in a portable information terminal connected to a NIC, comprising: a NIC reading step that reads an IP address previously stored in the NIC; and a portable information terminal setting step that sets the IP address read in the IP address reading step to the portable information terminal as the IP address thereof.

According to the present invention, it is possible to assign an IP address to a NIC even when a conventional NIC is used without change. Further, in a system using a large number of portable information terminals, the number of NICs and the number of IP addresses can be significantly reduced to less than the number of the portable information terminals, thereby considerably reducing cost for building a system.

DETAILED DESCRIPTION OF THE PREFERRED EMBODIMENTS

An embodiment of the present invention will be described below with reference to the accompanying drawings.

In the present invention, an IP address is set to a NIC and a potable information terminal connected to the NIC. Further, in the present invention, a USB-LAN adapter that connects to a portable information terminal through a USB interface is used as the NIC. Although the USB interface is used to connect the portable information terminal and NIC here, an interface other than the USB may be used.

Firstly, a configuration of the potable information terminal according to the present invention will be described.

Figure 1:
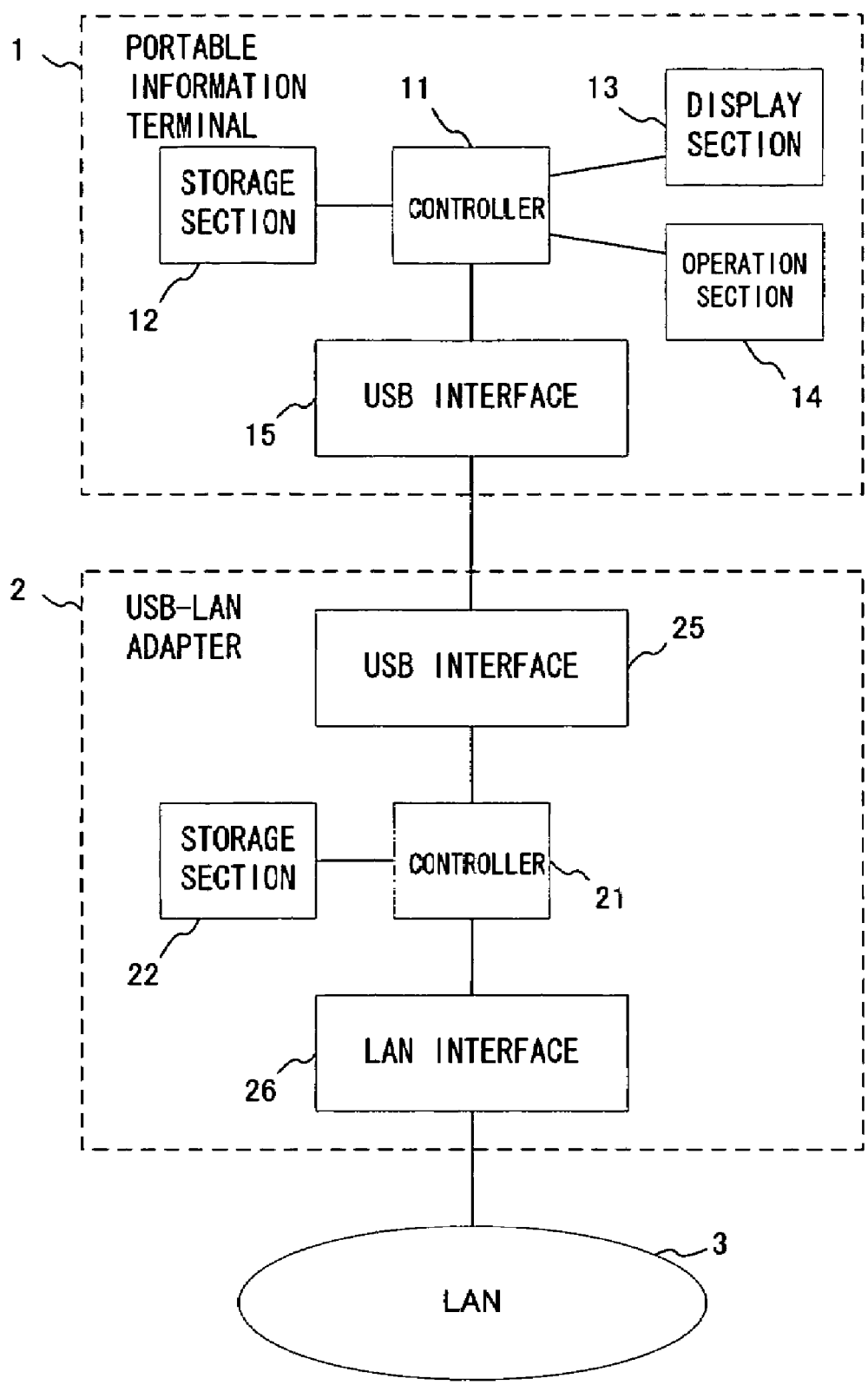
FIG. 1 is a block diagram showing an example of the hardware configuration of a portable information terminal according to the present invention.

FIG. 1 is a block diagram showing an example of the hardware configuration of the portable information terminal according to the present invention. A portable information terminal 1 is connected to a LAN 3 through a USB-LAN adapter 2. The portable information terminal 1 has a controller 11, a storage section 12, a display section 13, an operation section 14, and a USB interface 15. The USB-LAN adapter 2, which has the same configuration as a conventional one, has a controller 21, a storage section 22, a USB interface 25, and a LAN interface 26.

The controller 11 uses a program or data stored in the storage section 12 to control the portable information terminal 1. The storage section 12 stores a program or data, as well as IP address settings and IP address setting modes. The IP address setting modes include a terminal setting mode conventionally used and an adapter setting mode according to the present invention. In the terminal setting mode, an IP address is set to the OS of the portable information terminal 1; whereas in the adapter setting mode, an IP address is set to the USB-LAN adapter 2. These setting modes are previously set according to a user's instruction. The display section 13 displays information sent from the controller 11. The operation section 14 receives a user's operation and sends it to the controller 11. The USB interfaces 15 and 25 are general purpose-interfaces that connect the portable information terminal 1 and peripherals. Here, the USB interfaces 15 and 25 connect the portable information terminal 1 and USB-LAN adapter 2 through a connector.

The controller 21 uses data stored in the storage section 22 to control the USB-LAN adapter 2. The storage section 22 stores a previously set MAC (Media Access Control) address, as well as an IP address set by the portable information terminal 1 and is realized by, for example, an EEPROM (Electrically Erasable Programmable Read-Only Memory) which is a non-volatile semiconductor memory. Also in a conventional USB-LAN adapter, the EEPROM is used in order to store the MAC address. Since the EEPROM has an extra capacity, a USB-LAN adapter having a conventional configuration can be used as one for the present invention without change.

Figure 2:
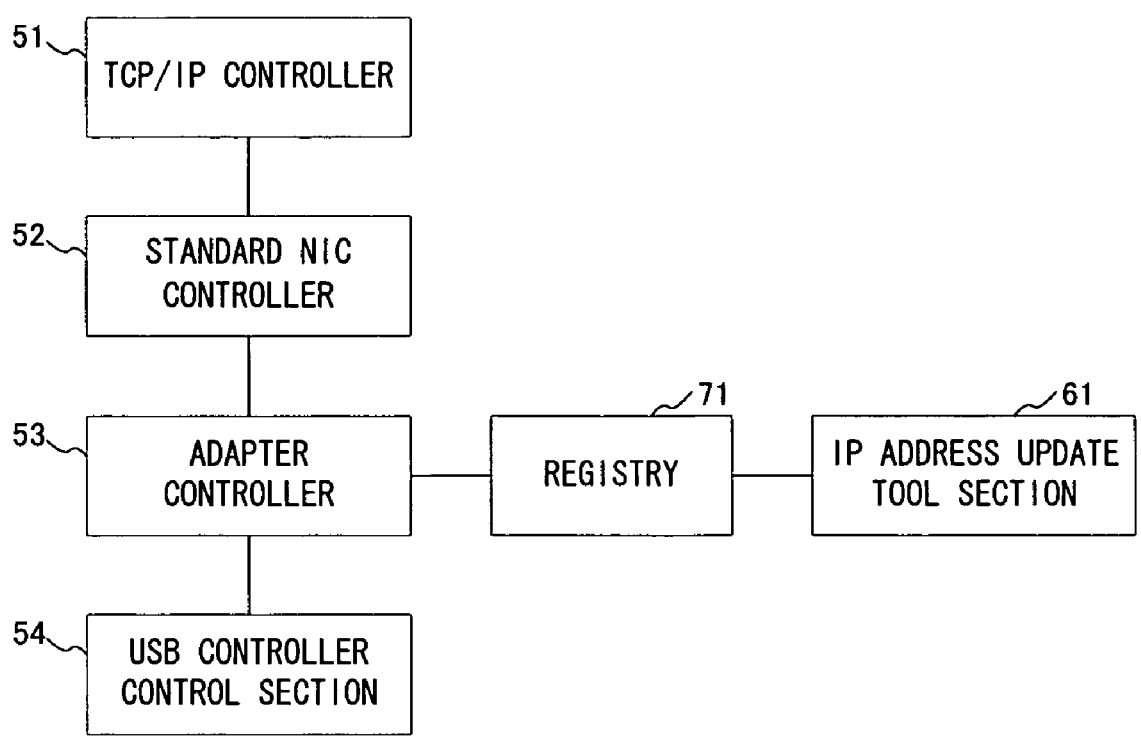
FIG. 2 is a block diagram showing an example of the software configuration relating to a TCP/IP communication in the portable information terminal according to the present invention.

FIG. 2 is a block diagram showing an example of the software configuration relating to a TCP (Transmission Control Protocol)/IP communication in the portable information terminal according to the present invention. The software relating to the TCP/IP communication in the portable information terminal 1 includes a TCP/IP controller 51, a standard NIC controller 52, an adapter controller 53, a USB controller control section 54, an IP address update tool section 61, and a registry 71.

The registry 71 has a function that stores an IP address, the IP address being written in and read out from the registry 71 by the adapter controller 53, IP address update tool section 61, and OS. The TCP/IP controller 51, which is provided by the OS, controls a TCP/IP communication requested by the OS or an application through the standard NIC controller 52. The standard NIC controller 52, which is provided by the OS, controls a communication with a standard NIC through the adapter controller 53. The standard NIC controller 52 is, for example, called NDIS (Network Driver Interface Specification).

The adapter controller 53 controls the USB-LAN adapter 2 through the USB controller control section 54. Further, the adapter controller 53 in the embodiment of the present invention performs reading and writing of an IP address for the storage section 22 of the USB-LAN adapter 2 and for the registry 71 as well as the communication control. The USB controller control section 54 controls the USB interface 15. The IP address update tool section 61 uses a GUI (Graphical User Interface) to receive a user's input and writes the input IP address in the registry 71.

An IP address setting operation will next be described.

Firstly, the IP address setting operation of the IP address update tool section 61 will be described.

Figure 3:
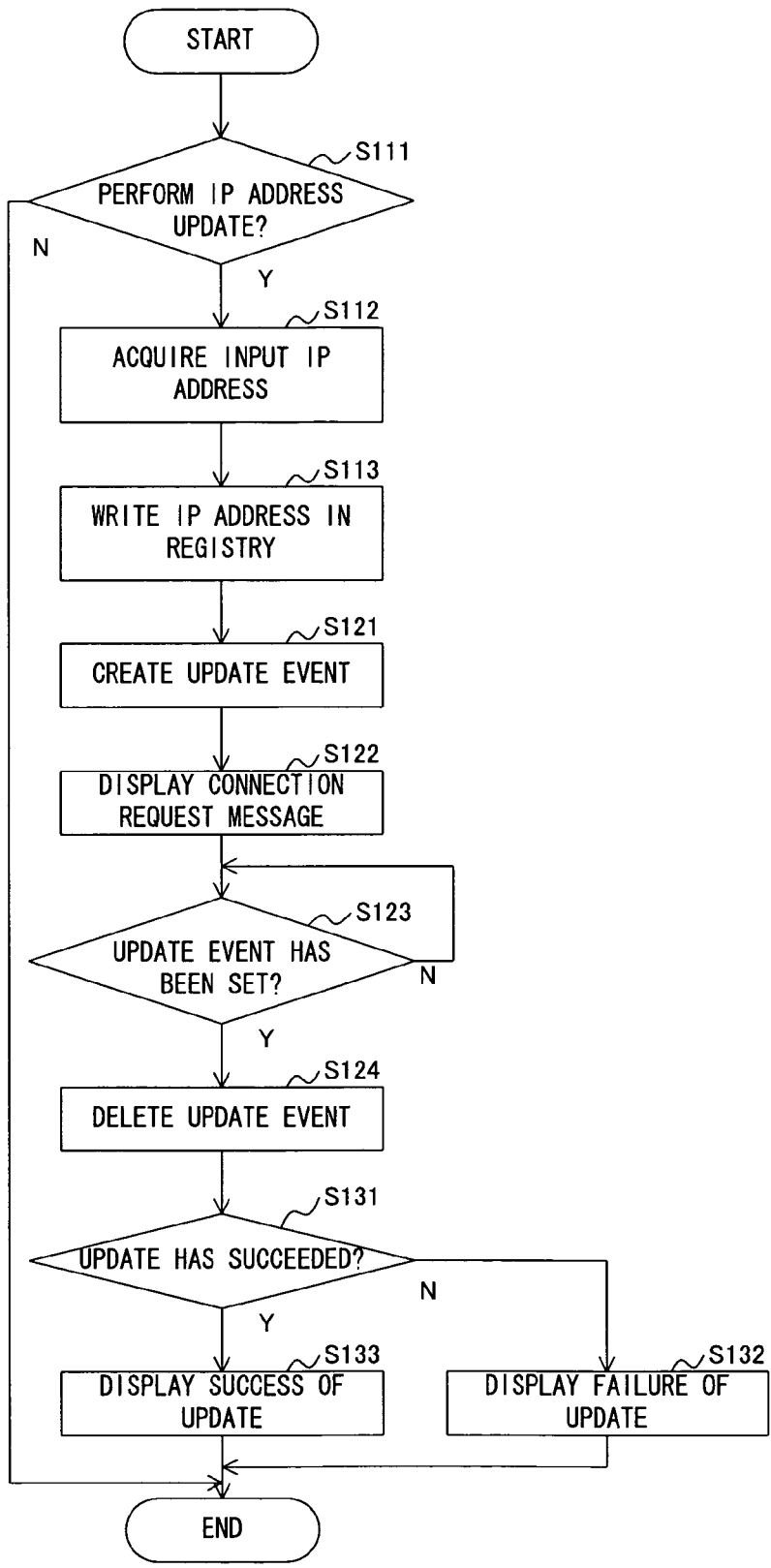
FIG. 3 is a flowchart showing an example of the operation of an IP address update tool section according to the present invention.

When receiving an instruction to set an IP address of the USB-LAN adapter 2 from a user through the operation section 14 of the portable information terminal 1, the controller 11 activates the IP address update tool section 61. FIG. 3 is a flowchart showing an example of the operation of the IP address update tool section 61 according to the present invention. The IP address update tool section 61 firstly determines whether to perform IP address update according to the user's operation on the operation section 14 (S111). When determining not to perform the IP address update (N in S111), the IP address update tool section 61 ends this flow. On the other hand, when determining to perform the IP address update (Y in S111), the IP address update tool section 61 acquires an IP address that the user has input on the operation section 14 (S112). Next, the IP address update tool section 61 writes the acquired IP address in the registry 71 (S113).

The IP address update tool section 61 then creates an update event for confirming the result of the write operation performed by the adapter controller 53 (S121). Next, the IP address update tool section 61 allows the display section 13 to display a connection request message that requests the user to connect the USB-LAN adapter 2 to the portable information terminal 1 (S122). Here, the massage says, for example, "Connect LAN adapter to USB terminal".

The IP address update tool section 61 then determines whether the adapter controller 53 has set the update event (S123). When determining that the update event has not been set (N in S123), the IP address update tool section 61 returns to S123 and enters a standby state. On the other hand, when determining that the update event has been set (Y in S123), the IP address update tool section 61 deletes the update event (S124) and determines whether the update has succeeded or not based on the content of the update event (S131). When the update has failed (N in S131), the IP address update tool section 61 allows the display section 13 to display an error message indicating the failure of the update (S132) and end this flow. On the other hand, when the update has succeeded (Y in S131), the IP address update tool section 61 allows the display section 13 to display a write-completion message indicating the completion of the update (S133) and ends this flow.

Secondly, the IP address setting operation of the adapter controller 53 will be described.

Figure 4:
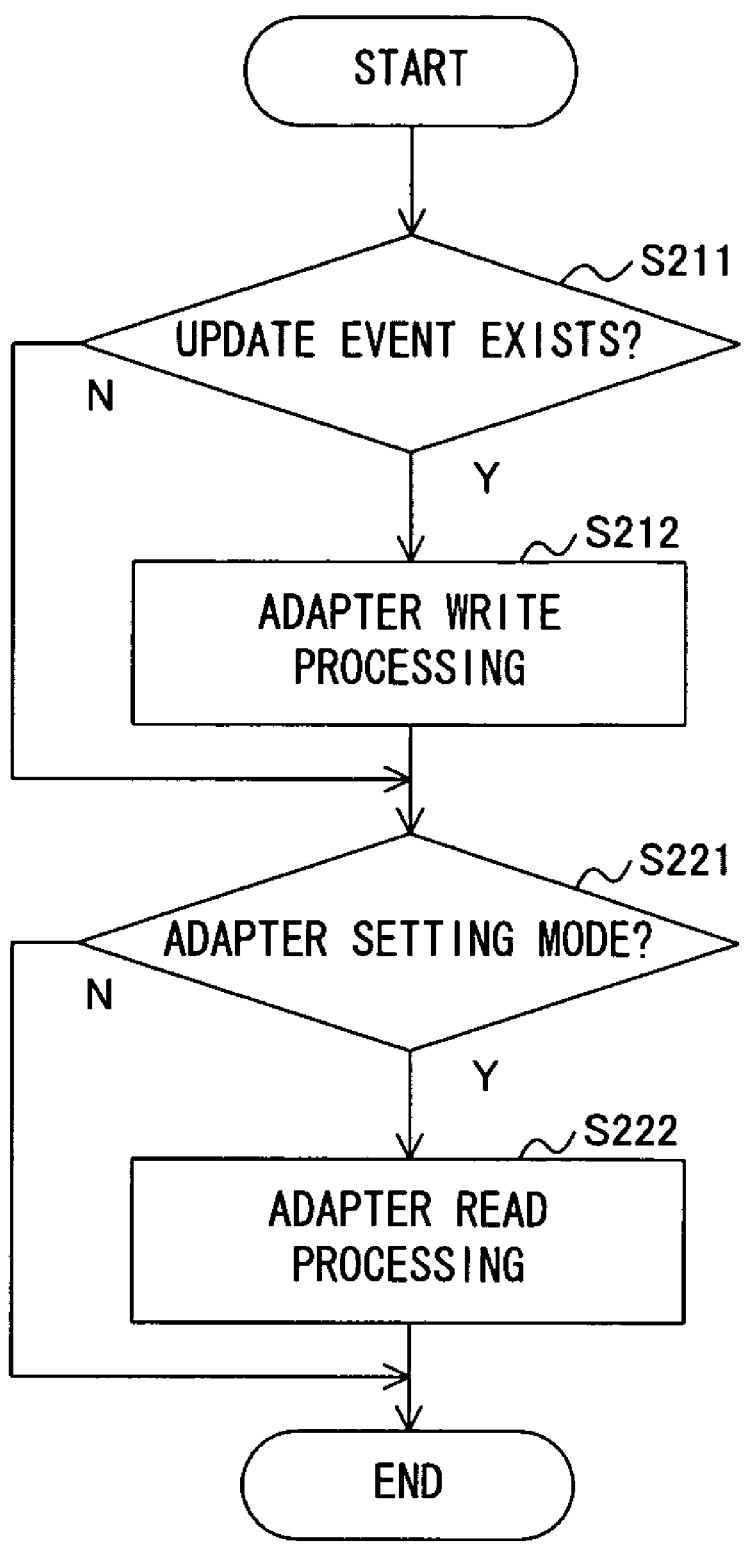
FIG. 4 is a flowchart showing an example of the operation of an adapter controller according to the present invention.

When the user connects potable information terminal 1 and USB-LAN adapter 2 according to the connection request message of S122, the adapter controller 53 initializes the USB-LAN adapter 2. In the initialization, the adapter controller 53 makes an IP address setting. FIG. 4 is a flowchart showing an example of the operation of the adapter controller according to the present invention. The adapter controller 53 firstly determines whether the update event exists or not (S211). When determining that the update event exists (Y in S211), the adapter controller 53 performs adapter write processing to write an IP address in the storage section 22 of the USB-LAN adapter 2 (S212) and shifts to S221. On the other hand, when determining that the update event does not exist (N in S211), the adapter controller does not perform the adapter write processing, but shifts to S221.

Next, in step S221, the adapter controller 53 determines whether previously set IP address setting mode is an adapter setting mode or not (S211). The IP address setting mode includes the adapter setting mode in which an IP address that has been set to the USB-LAN adapter 2 is set as the IP address of the OS of the portable information terminal 1 and portable information terminal setting mode in which an IP address that has been set to the OS of the portable information terminal 1 is used without change. When determining that the IP setting mode is the adapter setting mode (Y in S221), the adapter controller 53 reads the IP address stored in the storage section 22 of the USB-LAN adapter 2, performs adapter read processing to set the IP address to the OS of the portable information terminal 1, and ends this flow. On the other hand, when determining that the IP setting mode is the portable information terminal setting mode (N in S221), the adapter controller 53 ends this flow and uses the IP address that has been set to the OS of the portable information terminal 1 without change.

Next, the operation of the adapter write processing performed by the adapter controller 53 will be described.

Figure 5:
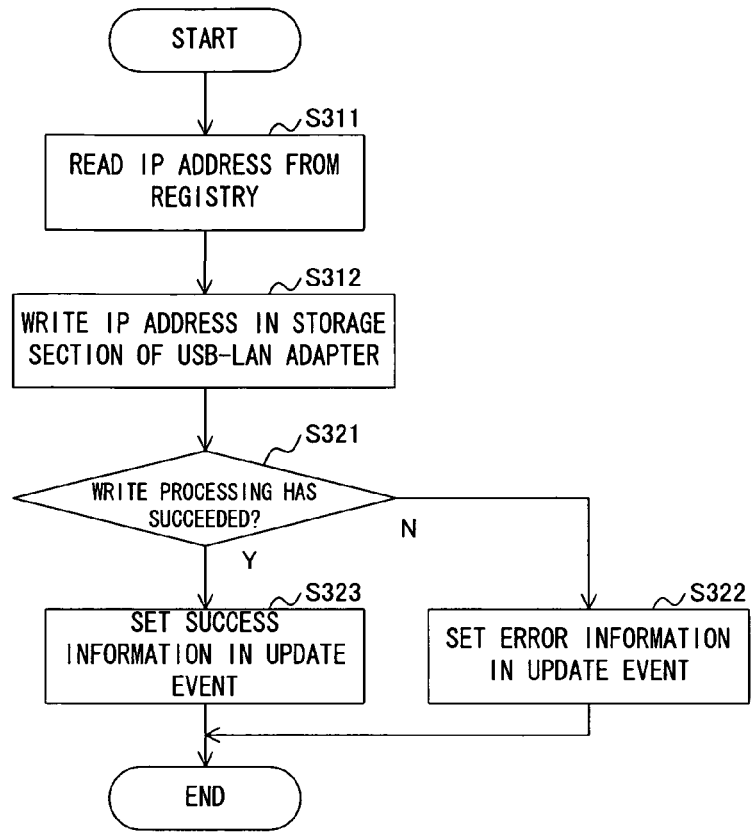
FIG. 5 is a flowchart showing an example of the operation of adapter write processing according to the present invention.

FIG. 5 is a flowchart showing an example of the operation of the adapter write processing according to the present invention. The adapter controller 53 firstly reads an IP address from the registry 71 (S311), writes the IP address in the storage section 22 (S312), and determines whether the write processing has succeeded or not (S321).

When determining that the write processing has failed (N in S321), the adapter controller 53 sets error information indicating the failure in the update event (S322) and ends this flow. On the other hand, when determining that the write processing has succeeded (Y in S321), the adapter controller 53 sets success information indicating the success in the update event (S323) and ends this flow.

Next, the operation of the adapter read processing performed by the adapter controller 53 will be described.

Figure 6:
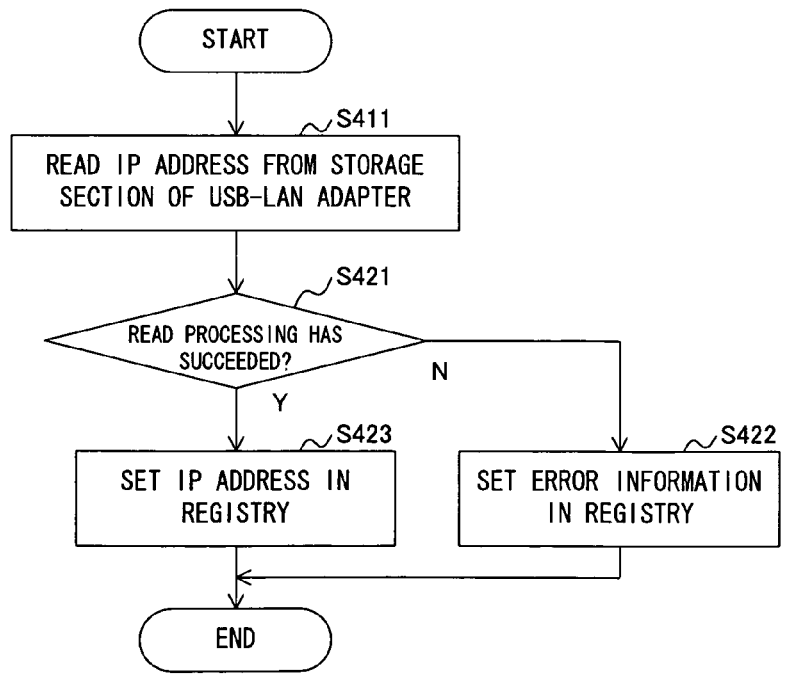
FIG. 6 is a flowchart showing an example of the operation of adapter read processing according to the present invention.

FIG. 6 is a flowchart showing an example of the operation of the adapter read processing according to the present invention. The adapter controller 53 firstly reads an IP address from the storage section 22 (S411) and determines whether the read processing has succeeded (S421).

When determining that the read processing has failed (N in S421), the adapter controller 53 writes error information indicating the failure of the read processing in the registry (S422) and ends this flow. On the other hand, when determining that the read processing has succeeded (Y in S421), the adapter controller 53 writes the read IP address in the registry 71 (S423) and ends this flow.

When an IP address exists in the registry 71 after the above IP address setting, the TCP/IP controller 51 uses the IP address to perform a TCP/IP communication. If error information has been written in the registry, the TCP/IP controller 51 performs predetermined error processing.

As described above, the assignation of a static IP address to the USB-LAN adapter allows a communication with a portable information terminal connected to a specified USB-LAN adapter and a control using the communication to be easily realized.

Further, it is possible to provide a program that allows a computer constituting the portable information terminal to execute the above respective steps as an IP address setting program. When the above program is stored in a computer-readable storage medium, it is possible to allow a computer constituting the portable information terminal to execute the program. The computer-readable storage medium mentioned here includes: an internal storage device implemented in a computer, such as an RAM or ROM, a portable storage medium such as a CD-ROM, a flexible disk, a DVD disk, a magneto-optical disk, or an IC card; a database that holds computer program; another computer and database thereof; and a transmission medium on a network line.

The USB interface in the embodiment corresponds to a NIC interface section; the adapter read processing in the embodiment corresponds to a NIC reading step and portable information terminal setting step; and the adapter write processing in the embodiment corresponds to a NIC writing step.

What is claimed is:

1. A portable information terminal that performs a communication using an IP address by being connected to a NIC, comprising:
    a NIC interface section that is connected to the NIC through a USB interface; and
    a controller that reads an IP address previously stored in the NIC, which is connected to the portable information terminal through the USB interface, through the NIC interface section and sets the IP address thus read to the portable information terminal as the IP address thereof;
    wherein when a user inputs an IP address, the controller writes the IP address input by the user into the NIC, which is connected to the portable information terminal through the USB interface, through the NIC interface section.

2. The portable information terminal according to claim 1, wherein
    the controller reads the IP address previously stored in the NIC connected to the portable information terminal through the USB interface at an initialization time of the NIC and sets the IP address thus read to the portable information terminal as the IP address thereof.

3. The portable information terminal according to claim 1, wherein,
when the user inputs the IP address, the controller writes the IP address input by the user in the NIC, which is connected to the portable information terminal through the USB interface, through the NIC interface section at an initialization time of the NIC.

4. The portable information terminal according to claim 1, wherein
the IP address stored in the NIC connected to the portable information terminal through the USB interface is stored in a non-volatile semiconductor memory in the NIC.

5. A computer readable medium containing therein an IP address setting program that causes a computer which is a portable information terminal to set an IP address to the portable information terminal connected to a NIC, the program a causing the computer to execute operations, comprising:
writing an IP address input by a user into the NIC connected to the portable information terminal through a USB interface;
reading the IP address previously stored in the NIC connected to the portable information terminal through the USB interface; and
setting the IP address read to a portable information terminal as the IP address thereof.

6. The computer readable medium containing therein the IP address setting program according to claim 5, wherein
the reading and setting of the IP address are executed at an initialization time of the NIC connected to the portable information terminal through the USB interface.

7. The computer readable medium containing therein the IP address setting program according to claim 5, wherein
the writing is executed at an initialization time of the NIC connected to the portable information terminal through the USB interface.

8. The IP computer readable medium containing therein the address setting program according to claim 5, wherein
the IP address stored in the NIC connected to the portable information terminal through the USB interface is stored in a non-volatile semiconductor memory in the NIC.

9. An IP address setting method that performs IP address setting in a portable information terminal connected to a NIC, the method comprising:
writing an IP address input by a user into the NIC connected to the portable information terminal through a USB interface;
reading the IP address previously stored in the NIC connected to the portable information terminal through the USB interface; and
setting the IP address read to a portable information terminal as the IP address thereof.

10. The IP address setting method according to claim 9, wherein
the reading and the setting are executed at an initialization time of the NIC connected to the portable information terminal through the USB interface.

11. The IP address setting method according to claim 9, wherein
the writing is executed at an initialization time of the NIC connected to the portable information terminal through the USB interface.

12. The IP address setting method according to claim 9, wherein
the IP address stored in the NIC connected to the portable information terminal through the USB interface is stored in a non-volatile semiconductor memory in the NIC.

* * * * *

UNITED STATES PATENT AND TRADEMARK OFFICE
CERTIFICATE OF CORRECTION

| | | |
|---|---|---|
| PATENT NO. | : 7,664,128 B2 | Page 1 of 1 |
| APPLICATION NO. | : 11/250574 | |
| DATED | : February 16, 2010 | |
| INVENTOR(S) | : Naoki Kurihara et al. | |

It is certified that error appears in the above-identified patent and that said Letters Patent is hereby corrected as shown below:

Column 7, Lines 16-17, change "the program a causing the computer to execute operations," to --the program causing the computer to execute operations,--.

Signed and Sealed this

Eighteenth Day of May, 2010

David J. Kappos
*Director of the United States Patent and Trademark Office*